(12) United States Patent
Ganesan et al.

(10) Patent No.: US 12,307,268 B1
(45) Date of Patent: May 20, 2025

(54) PLUGGABLE EXCEPTION HANDLING FOR ROBOTIC PROCESSES

(71) Applicant: NTT DATA Services, LLC, Plano, TX (US)

(72) Inventors: Dhurai Ganesan, Chennai (IN); Harsh Vinayak, Gurgaon (IN); Aananthanarayanan Pandian, Chennai (IN); Nareshkumar Gunasekaran, Kanchipuram (IN)

(73) Assignee: NTT DATA Services, LLC, Plano, TX (US)

( * ) Notice: Subject to any disclaimer, the term of this patent is extended or adjusted under 35 U.S.C. 154(b) by 300 days.

(21) Appl. No.: 17/344,578

(22) Filed: Jun. 10, 2021

(51) Int. Cl.
*G06F 40/20* (2020.01)
*G06F 9/451* (2018.01)
*G06F 11/34* (2006.01)

(52) U.S. Cl.
CPC .......... *G06F 9/451* (2018.02); *G06F 11/3476* (2013.01); *G06F 40/20* (2020.01)

(58) Field of Classification Search
CPC ....... G06F 9/451; G06F 40/20; G06F 11/3476
USPC ........................................................ 715/704
See application file for complete search history.

(56) References Cited

U.S. PATENT DOCUMENTS

| | | | |
|---|---|---|---|
| 10,659,403 B2 | 5/2020 | Smullen et al. | |
| 2007/0179833 A1 | 8/2007 | Moorthy et al. | |
| 2012/0159133 A1 | 6/2012 | Talwar et al. | |
| 2017/0045885 A1* | 2/2017 | Okumura | B60W 30/00 |
| 2017/0274908 A1* | 9/2017 | Huai | G05D 1/0214 |

* cited by examiner

*Primary Examiner* — Stephen S Hong
*Assistant Examiner* — Tionna M Burke
(74) *Attorney, Agent, or Firm* — Patterson + Sheridan, LLP

(57) ABSTRACT

In an embodiment, a method includes receiving input data related to an unexpected process scenario encountered by a bot executing a robotic process in a computing environment. The method also includes processing the input data to yield resultant data. The resultant data includes information related to user-interface text associated with the unexpected process scenario. The method also includes generating a prediction dataset identifying at least one handling option for the unexpected process scenario, where the generating is based, at least in part, on the resultant data. The method also includes providing data related to the prediction dataset to the bot as an instruction for handling the unexpected process scenario.

20 Claims, 4 Drawing Sheets

PLUGGABLE EXCEPTION HANDLING FOR ROBOTIC PROCESSES

BACKGROUND

Technical Field

The present disclosure relates generally to robotic processes and more particularly, but not by way of limitation, to pluggable exception handling for robotic processes.

History of Related Art

Task automation, while often desirable, is not always feasible. Robotic process automation (RPA) platforms have a tendency to provide a framework for automating tasks without providing a streamlined way to learn and adapt. Typically, extensive human intervention is necessary, which limits RPA's scope and volume of use. For example, if an event or exception occurs that a bot is not programmed to handle, the bot must generally be reprogrammed to explicitly address the event or exception and, thereafter, redeployed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of automatic exception handling for robotic processes. The method includes receiving input data related to an unexpected process scenario encountered by a bot executing a robotic process in a computing environment. The method also includes processing the input data to yield resultant data. The resultant data includes information related to user-interface text associated with the unexpected process scenario. The method also includes generating a prediction dataset identifying at least one handling option for the unexpected process scenario, where the generating is based, at least in part, on the resultant data. The method also includes providing data related to the prediction dataset to the bot as an instruction for handling the unexpected process scenario. Other embodiments of this aspect include corresponding computer systems, apparatus, and computer programs recorded on one or more computer storage devices, each configured to perform the actions of the methods.

In an embodiment, another general aspect includes a computer system that has a processor and memory. The processor and the memory in combination are operable to implement a method. The method includes receiving input data related to an unexpected process scenario encountered by a bot executing a robotic process in a computing environment. The method also includes processing the input data to yield resultant data. The resultant data includes information related to user-interface text associated with the unexpected process scenario. The method also includes generating a prediction dataset identifying at least one handling option for the unexpected process scenario, where the generating is based, at least in part, on the resultant data. The method also includes providing data related to the prediction dataset to the bot as an instruction for handling the unexpected process scenario.

In an embodiment, another genera aspect includes a computer-program product that further includes a non-transitory computer-usable medium having computer-readable program code embodied therein. The computer-readable program code is adapted to be executed to implement a method. The method includes receiving input data related to an unexpected process scenario encountered by a bot executing a robotic process in a computing environment. The method also includes processing the input data to yield resultant data. The resultant data includes information related to user-interface text associated with the unexpected process scenario. The method also includes generating a prediction dataset identifying at least one handling option for the unexpected process scenario, where the generating is based, at least in part, on the resultant data. The method also includes providing data related to the prediction dataset to the bot as an instruction for handling the unexpected process scenario.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
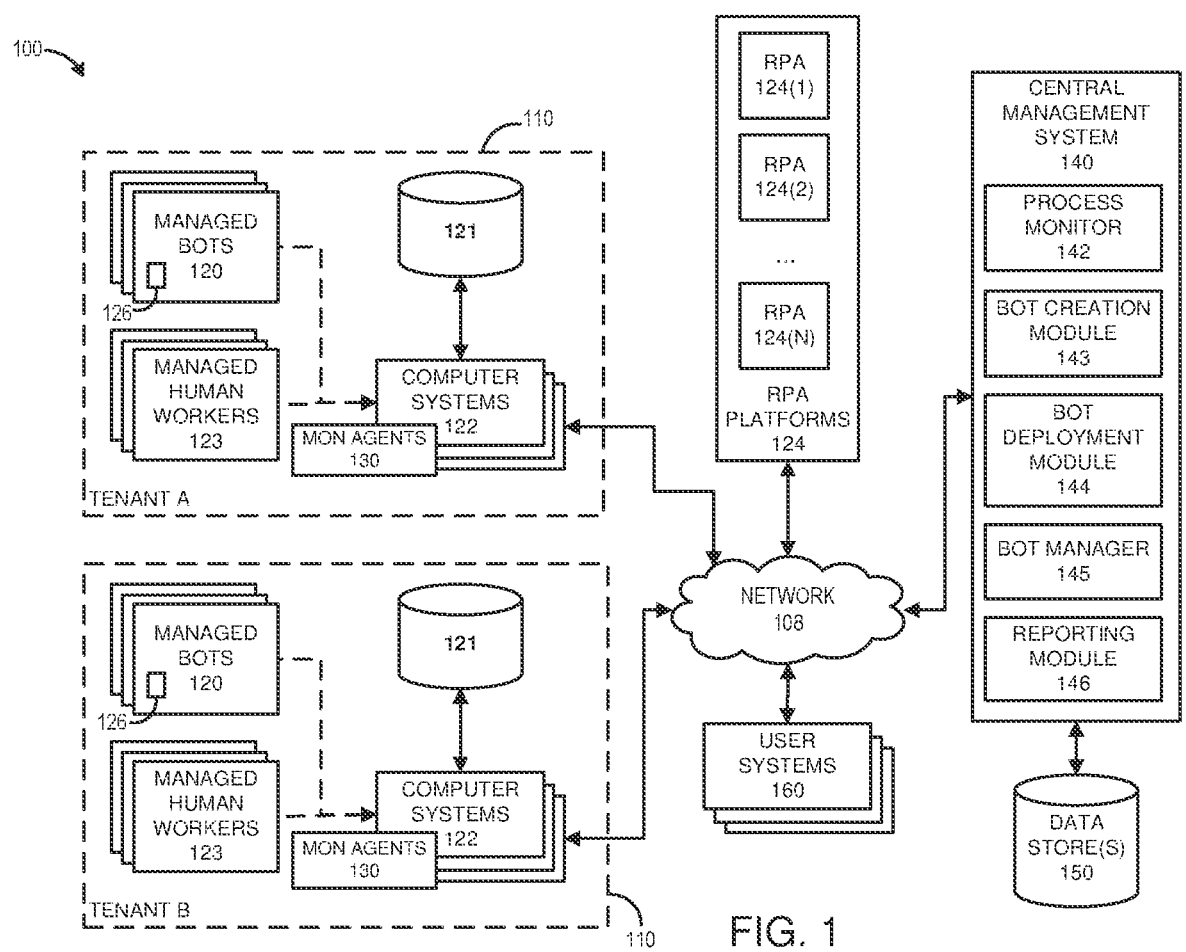
FIG. 1 illustrates an example of a system for implementing a central management system.

Robotic process automation (RPA) is the use of software, typically in combination with artificial intelligence (AI) and machine learning capabilities, to handle high-volume sequences of repeatable tasks that previously required humans to perform. These tasks can include interacting with a user interface (UI), for example, to perform, queries, calculations, maintenance of records and transactions, web automations, remote operations, database functions, terminal connections, desktop operations, text operations, mouse simulations, keyboard simulations, folder operations, file handlers, clipboard handlers, combinations of the foregoing and/or the like. RPA technology can mimic a human worker, for example, by logging into applications, entering data, calculating and completing tasks, and logging out.

RPA technology is not always part of an organization's information technology (IT) infrastructure, but can instead, sit on top of it, enabling an organization to implement RPA technology quickly and efficiently, without changing the existing infrastructure and systems. In various embodiments, a computing environment can include, for example, many hundreds or thousands of software agents, often referred to herein as "bots," that automatically perform robotic processes. In various cases, the sequence of computer-implemented tasks performed by each bot can be the same or different, or a combination thereof. Oftentimes, the computing environment can further include, for example, many hundreds or thousands of human workers that likewise execute the same or similar computer-implemented tasks, or a combination thereof, via manual interaction with UIs. A set or sequence of computer-implemented tasks, such as the foregoing example tasks, may be referred to as a user-executed process.

Although bots, potentially in combination with human workers, can provide greater efficiency via increased automation, bots introduce numerous technical problems. For example, when an exception or an unexpected scenario arises in an RPA system, bots generally cannot handle the exception or the unexpected scenario automatically. Traditionally, RPA uses rule-based automations that do not require decision-making capability. In real-life scenarios, such as workflow refinements and streamlining processes, such rule-based RPAs may face challenges to keep up with the processes and events and may require frequent human intervention to manually handle changes made in the system and environment. Frequent change in the system and environment can cause increased efforts and cost. The exceptions or the unexpected scenarios can be sent to human workers to handle the same, and in some cases, bots need to be reprogrammed by developers, for example, if these are frequent scenarios. In case the changes in the RPA system are permanent, eventually, one may need to change programming logic to deal with changes. In other words, substantial reprogramming may be necessary, with bots sometimes needing to be recreated. In such cases, robotic processes often must wait until manual changes occur, thereby delaying process execution.

The present disclosure describes examples of automatic and real-time exception handing by a pluggable exception-handling system. In various embodiments, the pluggable exception-handling system can listen to or record all activities done by bots, for example, and transfer the information to a self-learning system. In addition, in various embodiments, such collection of information or data can be used to allow bots to handle exceptions or new scenarios automatically with the help of AI decision-making. Examples will be described below relative to the Figures.

For purposes of this application, the term "UI" can include, without limitation, any type of human-machine interface. Example UIs include text-based interfaces such as command-line interfaces, conversational interfaces, crossing-based interfaces, direct manipulation interfaces, gesture interfaces, graphical UIs (GUIs), hardware interfaces, holographic UIs, intelligent UIs, motion tracking interfaces, natural-language interfaces, object-oriented UIs, reflexive UIs, touchscreen interfaces, touch UIs, voice UIs, and web-based UIs. Many of the aforementioned UIs accept input via input devices such as a keyboard, mouse, microphone, combinations of the foregoing, and/or the like. Inputs from any of these devices, in possible combination with specific UI objects or components, can be considered examples of UI events. For illustrative purposes, various examples will be described herein relative to GUIs and UI events that are detected or received in relation to GUIs. It should be appreciated, however, that the principles described herein are applicable to any type of UI, inclusive of the example UIs mentioned previously. A user, unless specifically stated otherwise, or otherwise understood within the context as used, can include any entity, including a human or bot, that can interact with a UI.

FIG. 1 illustrates an example of a system 100 for implementing a central management system 140 for user-executed processes. The system 100 includes the central management system 140, tenant systems 110, RPA platforms 124, user systems 160 and one or more data stores 150, each of which is operable to communicate over a network 108. The network 108 may be, or include, one or more of a private network, a public network, a local or wide area network, a portion of the Internet, combinations of the same, and/or the like.

In some aspects, the central management system 140 can centrally manage bot deployments on the RPA platforms 124 for its tenants. The RPA platforms 124 are shown to include an RPA platform 124(1), an RPA platform 124(2) and an RPA platform 124(N). It should be appreciated that three RPA platforms are shown among the RPA platforms 124 only for illustrative purposes. In various implementations, any number of RPA platforms can be included among the RPA platforms 124. In a typical embodiment, the RPA platforms 124 each provide RPA software for creating and executing bots, generally using different RPA technology, interfaces and formats.

In particular, in the system 100, the tenant systems 110 can be served by the central management system 140. In general, the tenant systems 110 can each be considered an abstraction of users, inclusive of both bots and human workers, that execute user-executed processes managed by the central management system 140, and the systems and data sources with which those users interact. For example, one of the tenant systems 110 is shown as being owned or operated by "Tenant A" while another system 110 is shown as being owned or operated by a different tenant, "Tenant B." The tenant systems 110 shown can be owned or operated by the same or different entities. For example, Tenants A and B can represent customers (e.g., entities such as companies or individuals) of an operator of the central management system 140. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more managed bots 120, one or more managed human workers 123, one or more computer systems 122 and one or more data sources 121. The one or more computer systems 122 can each provide a computing environment, inclusive of applications and corresponding UIs and dashboards, for executing configurable tasks. As illustrated, any given one of the computer systems 122 may be operated by one of the managed bots 120 or one of the human workers 123. In some cases, the computer systems 122 may represent desktop virtualization environments. In such cases, the human workers 123, for example, may operate the user systems 160 and access the desktop virtualization environments over the network 108.

The one or more data sources 121 of each of the tenant systems 110 can include data streams or datasets that can be received or processed by the computer systems 122, potentially as part of executing the configurable tasks. In various cases, the one or more data sources 121 can be updated by the computer systems 122, or other components, in real-time, on a periodic basis, e.g., according to a schedule, on-demand or a combination of the same. In various cases, the tasks for which the computer systems 122 are configured can be executed in the respective computing environments, for example, manually by the human workers 123 and/or robotically by the managed bots 120. In a typical embodiment, the managed bots 120 are each deployed on an RPA platform of the RPA platforms 124 and interact as users in the computing environments of the computer systems 122 for purposes executing some or all of the configurable tasks as robotic processes.

The managed bots 120 can each include an instruction set 126 that can be used to provide the managed bots 120 a complete set of all computer-implemented tasks or steps that are to be performed in sequence automatically by the managed bots 120, for example, as a user-executed process. In some embodiments, the instruction set 126 is in a machine-readable code that can be recognized and executed by a central processing unit. In various embodiments, the instruction set 126 can be made up of, for example, a markup language, a low-level programming language, a high-level programming language, a scripting language, a machine language, an assembly language or any combination thereof.

As illustrated, the computer systems 122 can include monitoring agents 130. The monitoring agents 130 are software agents that can be used to provide information regarding some or all of the managed bots 120. In certain embodiments, the monitoring agent 130 can be individually triggered, for example, by a human user of one of the user systems 160, to monitor and record user activity in the computing environments provided by the computer systems 122. The user activity can represent, for example, user-executed processes in the computing environments. The user activity can include, for example, UI activity.

In the illustrated embodiment, the central management system 140 can include a process monitor 142, a bot manager 145, a bot deployment module 144, a reporting module 146 and a bot creation module 143. Each of these components can be implemented with hardware and/or software, including (optionally) virtual machines and containers. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the system 100 may be hosted on a cloud-provider system.

In certain embodiments, features of the components of the central management system 140 can be made accessible over an interface to the user systems 160. The user systems 160 can include any type of computing device, including desktops, laptops, tablets, and smartphones, to name a few. The user systems 160 can be operated by users, such as the human workers 123, or by other users, for example, for administration purposes.

The process monitor 142 can, for each of the tenant systems 110, in collaboration with the monitoring agent 130, monitor execution of user-executed processes by the managed bots 120 and/or the human workers 123. In certain embodiments, the process monitor 142 and/or the monitoring agent 130 can implement pluggable exception handling, for example, for the managed bots 120, such that exceptions can be automatically handled without modifying or redeploying the managed bots 120. Example implementation of pluggable exception handling using the process monitor 142 and/or the monitoring agent 130 will be described in greater detail relative to FIG. 2.

The bot creation module 143 can be utilized to create bots such as, for example, the managed bots 120. In some embodiments, an instruction set is created via the bot creation module 143 that contains all of the instructions and/or modules for a specific type of bot. The instruction set that is created can be similar to the instruction set 126 of each of the managed bots 120. In certain embodiments, the bot creation module 143 can utilize information from the process monitor 142 to automatically create each instruction set. In some embodiments, the bot creation module 143 includes or provides a configuration interface for manual creation of an instruction set, or for revision or tuning of an automatically created instruction set. The configuration interface can be accessible, for example, by the user systems 160.

In certain embodiments, the bot deployment module 144 can be utilized to deploy a bot on the RPA platforms 124 for a tenant, such that the deployed bot becomes one of the managed bots 120. In various embodiments, the bot deployment module 144 can utilize an instruction set created by the bot creation module 143 that can then be deployed. For example, the instruction set 126 of one of the managed bots 120 could be representative of a bot created by the bot creation module 143 and then deployed via the bot deployment module 144. In certain embodiments, the bot deployment module 144 can be used to deploy a single bot and/or a plurality of bots concurrently. In many cases, the bot deployment module 144 can be utilized to deploy bots on a variety of the RPA platforms 124. In some embodiments, the bot deployment module 144 can publish a configuration interface to the user systems 160, for example, for administrators, super users or other users (e.g., of a particular tenant) to select or specify such commands. In other embodiments, the bot deployment module 144 executes an automatic process to deploys bots without manual interaction. In various embodiments, the bot deployment module 144 can store command sets for some or all of the RPA platforms 124.

The bot manager 145 can serve to manage bots such as, for example, the managed bots 120, for tenants. In certain embodiments, the bot manager 145 can issue commands to control operation of bots. The bot manager 145 can be utilized to re-configure, optimize and/or customize any of the managed bots 120. For example, various commands can start or stop bots, perform configuration management, combinations of the same and/or the like. In some cases, the bot manager 145 can publish a configuration interface to the user systems 160, for example, for administrators, super users or other users (e.g., of a particular tenant) to select or specify such commands.

The reporting module 146 can generate regular or on-demand reports related to the managed bots 120 and the managed human workers 123. In various cases, these reports can provide a snapshot of some or all of the managed bots 120 and the managed human workers 123 (e.g., regarding performance gaps as described further below). The reporting module 146 can publish reports or other generated information, for example, to a webpage, user dashboard, and/or the like. The reporting module 146 can generate and execute a query of the one or more data stores 150, as appropriate. The web page, user dashboard or other UI(s) output, for example, by the reporting module 146, can be accessed by certain users of the user systems 160.

In general, the one or more data stores 150 can include any information collected, stored or used by the central management system 140. For example, in various embodiments, the one or more data stores 150 can include instruction sets for bots, command sets for one or more of the RPA platforms 124, deployment settings for bots (e.g., on a tenant-specific and/or bot-specific basis), metadata for bots to be deployed, data collected from the managed bots 120, the human workers 123 or the computer systems 122, combinations of the same and/or the like. In certain embodiments, data stored in the one or more data stores 150 can take the form of repositories, flat files, databases, etc. In certain embodiments, the one or more data stores 150 can be utilized as an event library, in which actions performed by any of the managed bots 120 and/or the user systems 160 are stored. The event library can also contain business rule libraries, exception libraries, control libraries, keyboard libraries, database libraries and/or cognitive libraries.

Figure 2:
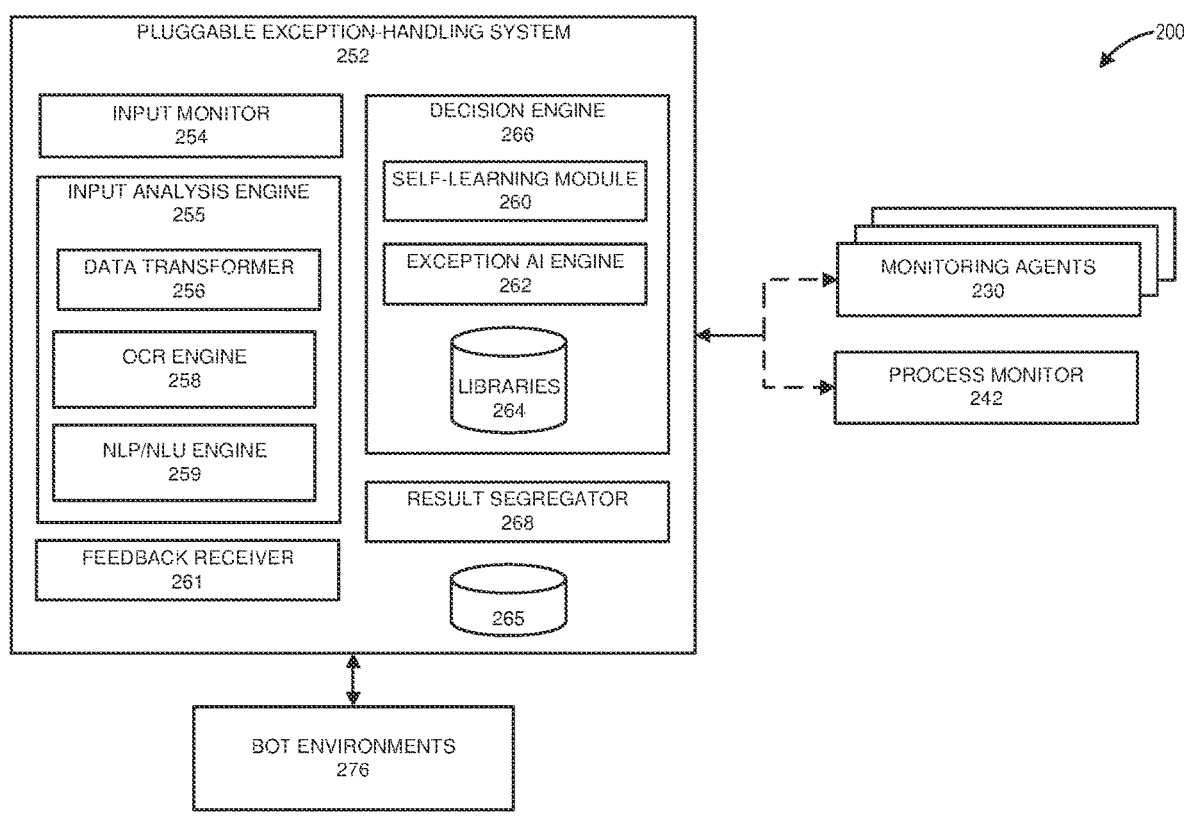
FIG. 2 illustrates an example of an environment for a pluggable exception-handling system for a robotic process.

FIG. 2 illustrates an example of an environment 200 for a pluggable exception-handling system 252 for robotic processes. The environment 200 includes the pluggable exception-handling system 252, monitoring agents 230, a process monitor 242 and bot environments 276. The bot environments 276 are generally operated by bots such as the managed bots 120 of FIG. 1.

The pluggable exception-handling system 252 is configured to identify and handle, in real-time, unexpected process scenarios, or exceptions, that are encountered, for example, by the managed bots 120, in the bot environments 276. The pluggable exception-handling system 252 includes an input monitor 254, an input analysis engine 255, a feedback receiver 261, a decision engine 266, a result segregator 268 and a data store 265. As illustrated, in various embodiments, operation of the pluggable exception-handling system 252 can be distributed between the monitoring agent 130 and the process monitor 142 in any suitable fashion. In general, the monitoring agents 230 and the process monitor 242 can each operate as described relative to the monitoring agent 130 and the process monitor 142, respectively, of FIG. 1.

The input monitor 254 can collect and monitor any suitable data regarding bot operation from the monitoring agents 230, the bot environments 276, the managed bots 120, the RPA platforms 124, and/or the like. Based on this data, the input monitor 254 can identify and trigger handling of unexpected process scenarios, sometimes referred to as exceptions. In general, an unexpected process scenario can include any situation that a given bot cannot handle on its own, for example, due to insufficient program logic.

Examples of unexpected process scenarios can include, for example, error messages (e.g., a password-expired message), fluctuating response time (e.g., in a browser window), an unknown window (e.g., a window that a given bot cannot interpret and handle), unknown or missing information (e.g., a required data field that a given bot does not know how to handle), an unknown address (e.g., a given bot cannot determine an address, or which of multiple addresses, to extract for entry in a data-entry screen) and/or the like. In traditional implementations, such unexpected process scenarios may result in underlying transactions being rerouted, for example, for interpreting and handling by the managed human workers 123. In various embodiments, the input monitor 254 can intercede and work with other components, such as the input analysis engine 255 and the decision engine 266, to automatically interpret unexpected process scenarios and determine appropriate handling.

In some embodiments, the input monitor 254 can be notified of an unexpected process scenario, for example, by the managed bots 120, with the notification including or identifying input data related to the unexpected process scenario. In addition, or alternatively, the unexpected process scenarios may be identified by the input monitor 254, by receiving and analyzing collected data. In such cases, the input monitor 254 can collect or determine the input data for the unexpected process scenario. The input data can be stored, for example, in the data store 265.

Input data for a given unexpected process scenario can include any available data regarding data, environment, or other conditions. For example, the input data can include image data such as, for example, an image of a UI in which the unexpected process scenario is presented. In another example, the input data can include log data for a given one of the bot environments 276 in which the unexpected process scenario is presented. In yet another example, the input data can include or identify a dataset (or portion thereof) being processed by a given managed bot (e.g., a dataset including multiple addresses such that the given managed bot lacks logic for selecting from multiple address options).

The input analysis engine 255 is operable to process data provided by the input monitor 254 and/or other components to yield resultant data for AI analysis. In the illustrated embodiment, the input analysis engine 255 includes a data transformer 256, an optical character recognition (OCR) engine 258 and a natural language process (NLP)/natural language understanding (NLU) engine 259. Data generated by a component of the input analysis engine 255 can be stored, for example, in the data store 265. Example operation of the foregoing components of the input analysis engine 255 will be described below.

The data transformer 256 can transform input data obtained, collected or provided by the input monitor 254 or other components. For example, log data may exist or be compiled in different formats and thus be referred to as heterogeneous log data. In some cases, if desirable, the data transformer 256 can homogenize such data into homogeneous log data. In some cases, the homogeneous log data can be in a structured format that is represented, for example, using XML. The OCR engine 258 can utilize OCR technology to extract, for example, relevant text from an image of a UI associated, for example, with a given unexpected process scenario. As mentioned previously, one or more UI images may be included as part of the input data for unexpected process scenarios. For convenience, text from a UI associated a with a given unexpected process scenario, whether extracted via the OCR engine 258 or obtained in another suitable fashion, may be referred to herein simply as UI text.

The NLP/NLU engine 259 is operable to execute NLP and NLU logic, for example, on input data for an unexpected process scenario. In some cases, the NLP and NLU logic can be executed on processed input data such that, for example, it has been operated on, at least in part, by the data transformer 256 and/or the OCR engine 259 as described above. In some embodiments, the NLP/NLU engine 259 is based, at least in part, on the PYTHON NATURAL LANGUAGE TOOLKIT, STANFORD'S CORE NLP SUITE, APACHE LUCENE AND SOLR, APACHE OPENNLP, SPACY, GATE and/or APACHE UIMA, and/or the like. In various embodiments, the NLP/NLU engine 259 can be utilized to understand the meaning of the input data (e.g., meaning of UI text). In various embodiments, the NLP/NLU engine 259 can read the input data, categorize the input data using a context-awareness analysis, remove noise, and generate cognitive rules based on its analysis. The cognitive rules can be used, for example, to instruct or inform operation of the decision engine 266.

For example, the cognitive rules can include both generic information and knowledge based on historical data through multiple transactions. This information can be classified and created with multiple libraries based on the type of elements. For example, if the element is an unstructured text, an ML model could be created with Long Short-Term Memory (LSTM) networks, where LSTM networks are a type of recurrent neural network capable of learning order dependence in sequence prediction problems. In another example, if the element is structured text, a model could be created with Artificial Neural Network (ANN) based models. In still another example, if the element relates to numeric data, a model can be created using linear regression. During the decision making conducted, for example, via the decision engine 266, the correct respective model would be invoked, based on the type of the input element, for result comparison before passing results to the next stage.

The feedback receiver 261 can receive feedback usable for continuous learning and improvement in handling of unexpected process scenarios. As will be described in greater detail below, the feedback data can be provided to the decision engine 266 and utilized for self-learning. The feedback data can include any suitable data regarding bot operation from the monitoring agents 230, the bot environments 276, the managed bots 120, the RPA platforms 124, and/or the like. In some embodiments, the feedback data can include data subsequent to automatic handling of a given unexpected process scenario, with the data being used to validate the correctness of prior handling options. In some cases, the feedback can include, or be used to solicit and obtain, human indications of whether particular handling options are correct or incorrect for the given unexpected process scenario. In addition, or alternatively, the feedback can include, or be used to solicit and obtain, human indications of a correct handling option for the given unexpected process scenario.

The decision engine 266 is operable to develop and utilize AI, including machine learning, to produce prediction results for unexpected process scenarios. The prediction results can include, for example, predicted exception results based on the one or more machine-learning models. The decision engine 266 includes a self-learning module 260, an exception AI engine 262, and libraries 264. The libraries 264 can include, for example, machine-learning libraries, deep-learning libraries and data-mining libraries. Example operation of the foregoing components of the decision engine 266 will be described below.

The self-learning module 260 can incrementally or continuously learn handling options for unexpected process scenarios using, for example, the libraries 264, cognitive rules produced by the NLP/NLU engine 259, and feedback from the feedback receiver 261. Handling options can include, for example, actions, information, warnings and/or the like. For example, if an unexpected process scenario relates to a change-password window, an action could relate to action that should be taken in a UI such as, for example, selecting "ignore," "dismiss" or the like, selecting a new password that is saved, etc. In another example, if the unexpected process scenario relates to unknown or missing information (e.g., a required data field that a given bot does not know how to handle), an information-type handling option could include recognizing a correct address based on a machine-learning model and providing either the correct address or a location of same to a given bot. In still another example, a warning-type handling option might include, for example, indicating error or malfunctioning within a given bot for auditing or logging purposes.

In various embodiments, the self-learning module 260 can initially create one or more machine-learning models for unexpected process scenarios based on an initial dataset, where each machine-learning model can correspond to a specific target UI, a robotic process, a step or task of a robotic process, and/or a particular tenant. In some cases, the self-learning module 260 can create a machine-leaning model that is generic, for example, across UIs, robotic processes, steps or tasks, and/or tenant. Thereafter, the self-learning module 260 can facilitate incremental learning based on new information. Models created and updated by the self-learning module 260 can be included in the libraries 264.

The exception AI engine 262 can interact with the input analysis engine 255, the input monitor 254 and/or other components to enable automatic handling of unexpected process scenarios. In some aspects, the exception AI engine 262 receives new cognitive rules from the NLP/NLU engine 259, for example, for an unexpected process scenario. In some cases, the exception AI engine 262 can further receive input data and/or processed input data of the type described above. The exception AI engine 262 uses the cognitive rules and/or other provided data to generate a prediction dataset based on the libraries 264. The predication dataset can include, for example, prediction results that set forth specific prediction metrics for specific handling options. The specific handling options can include, for example, one or more actions, one or more sets of information, one or more warnings, and/or the like.

The result segregator 268 receives prediction results for an unexpected process scenario from the exception AI engine 262. The result segregator 268 segregates the prediction results according into types of handling option such as, for example, action, information and warning. In a typical embodiment, the segregated prediction results are provided, in whole or in part, to a bot that was presented an underlying unexpected process scenario. In some embodiments, only the highest prediction result of each particular type, or an overall highest prediction result, may be provided to the bot. In typical embodiment, the segregated predicted results, or a subset thereof, may be used by the bot as instructions for resolving the underlying unexpected process scenario automatically and in real-time. Advantageously, in certain embodiments, instruction in this fashion avoids a need to reprogram or scrape the bot to handle such unexpected process scenarios. Furthermore, a need to reroute such unexpected process scenarios to human workers can be minimized or avoided.

Figure 3:
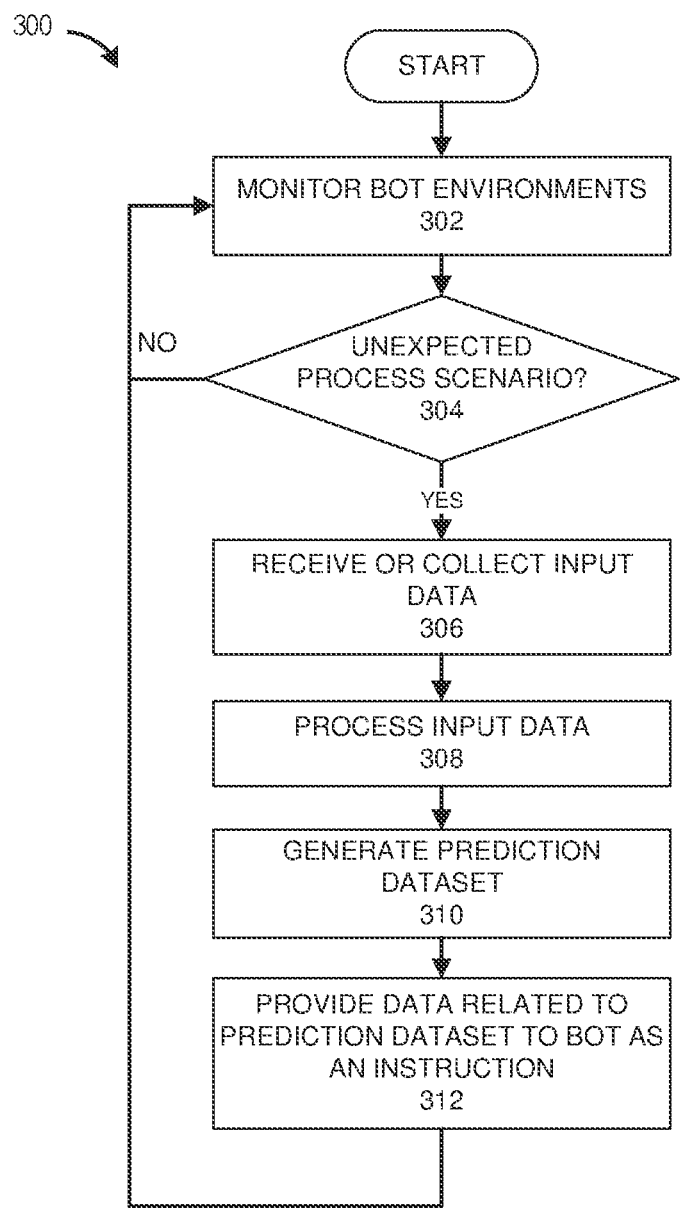
FIG. 3 illustrates an example of a process for operating a pluggable exception-handling system.

FIG. 3 illustrates an example of a process 300 for operating a pluggable exception-handling system such as the pluggable exception-handling system 252 of FIG. 2. In certain embodiments, the process 300 can be implemented by any system that can process data. Although any number of systems, in whole or in part, can implement the process 300, to simplify discussion, the process 300 will be described in relation to particular components shown and described relative to FIGS. 1-2.

At block 302, the pluggable exception-handling system 252 monitors the bot environments 276. The block 302 can include, for example, the input monitor 254 monitoring for unexpected process scenarios in the bot environments 276. Further, in various embodiments, the block 302 can include the feedback receiver periodically receiving feedback and providing the feedback, for example, to the self-learning module 260, which executes incremental or continuous learning as described previously.

At decision block 304, the input monitor 254 determines whether an unexpected process scenario has been detected, for example, as a result of a notification received by the input monitor 254 or as a result of an identification by the input monitor 254. If not, the process 300 returns to block 302 and executes as described previously. Otherwise, if it is determined at the decision block 304 that an unexpected process scenario has been detected, the process 300 proceeds to block 306.

At block 306, the input monitor 254 receives or collects input data for the unexpected process event. In a typical embodiment, the unexpected process scenario has been experienced, for example, by one of the managed bots 120 in one of the bot environments 276. In general, the input data can be received or collected in any of the ways described relative to FIG. 2.

At block 308, the input monitor 254 causes the input analysis engine 255 to process the input data to yield resultant data. The block 308 can include, for example, the data transformer 256, the OCR engine 258 and the NLP/NLU engine 259 operating on the input data as described above relative to FIG. 2. The resultant data can include, for example, and any of the above-described data that may be produced by the data transformer 256, the OCR engine 258 and/or the NLP/NLU engine 259.

At block 310, the input monitor 254 causes the exception AI engine 262 to generate a prediction dataset based, at least in part, on the input data. The prediction dataset can be generated, for example, using the resultant data from the block 308. The prediction dataset can include, for example, prediction results as described above relative to FIG. 2. In typical embodiment, the prediction results include prediction metrics for one or more options for handling the unexpected process scenario.

At block 312, the input monitor 254 causes the results segregator 268, or another component, to provide data related to the prediction dataset to the bot as an instruction for handling the unexpected process scenario. For example, the results segregator 268 can segregate the prediction results of the prediction dataset into a plurality of types of handling options such as, for example, warning, information and action. In addition, the results segregator 268 can instruct the bot according to all or a portion of the handling options, where the bot thereafter implements the instruction to handle the unexpected process scenario. Advantageously, in certain embodiments, the above-described approach allows the bot to handle the unexpected process scenario, which it was not programmed to handle, automatically and without requiring modification or redeployment. From block 312, the process 300 returns to the block 302 and executes as described previously. The process 300 can continue to execute until terminated by an administrator or other user or until other suitable stop criteria is satisfied.

Figure 4:
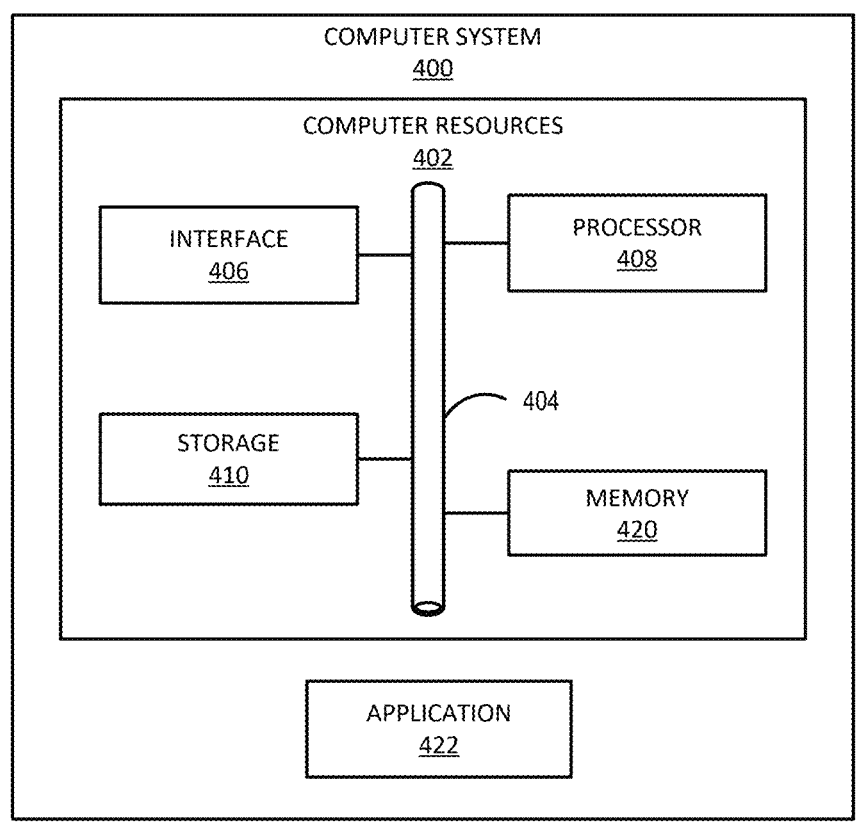
FIG. 4 illustrates an example of a computer system.

FIG. 4 illustrates an example of a computer system 400 that, in some cases, can be representative, for example, of the central management system 140, the RPA platforms 124, the tenant systems 110, the user systems 160 and/or a module or sub-component of the foregoing. The computer system 400 includes an application 422 operable to execute on computer resources 402. The application 422 can be, for example, any of the systems or modules illustrated in FIG. 1 or FIG. 2. In particular embodiments, the computer system 400 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 400 may comprise any suitable physical form, configuration, number, type and/or layout. As an example, and not by way of limitation, the computer system 400 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 400 may include one or more computer systems; be unitary or distributed; span multiple locations; span multiple machines; or reside in a cloud, which may include one or more cloud components in one or more networks.

In the depicted embodiment, the computer system 400 includes a processor 408, memory 420, storage 410, interface 406, and bus 404. Although a particular computer system is depicted having a particular number of particular components in a particular arrangement, this disclosure contemplates any suitable computer system having any suitable number of any suitable components in any suitable arrangement.

Processor 408 may be a microprocessor, controller, or any other suitable computing device, resource, or combination of hardware, software and/or encoded logic operable to execute, either alone or in conjunction with other components, (e.g., memory 420), the application 422. Such functionality may include providing various features discussed herein. In particular embodiments, processor 408 may include hardware for executing instructions, such as those making up the application 422. As an example, and not by way of limitation, to execute instructions, processor 408 may retrieve (or fetch) instructions from an internal register, an internal cache, memory 420, or storage 410; decode and execute them, and then write one or more results to an internal register, an internal cache, memory 420, or storage 410.

In particular embodiments, processor 408 may include one or more internal caches for data, instructions, or addresses. This disclosure contemplates processor 408 including any suitable number of any suitable internal caches, where appropriate. As an example, and not by way of limitation, processor 408 may include one or more instruction caches, one or more data caches, and one or more translation lookaside buffers (TLBs). Instructions in the instruction caches may be copies of instructions in memory 420 or storage 410 and the instruction caches may speed up retrieval of those instructions by processor 408. Data in the data caches may be copies of data in memory 420 or storage 410 for instructions executing at processor 408 to operate on; the results of previous instructions executed at processor 408 for access by subsequent instructions executing at processor 408, or for writing to memory 420, or storage 410, or other suitable data. The data caches may speed up read or write operations by processor 408. The TLBs may speed up virtual-address translations for processor 408. In particular embodiments, processor 408 may include one or more internal registers for data, instructions, or addresses. Depending on the embodiment, processor 408 may include any suitable number of any suitable internal registers, where appropriate. Where appropriate, processor 408 may include one or more arithmetic logic units (ALUs); be a multi-core processor; include one or more processors 408; or any other suitable processor.

Memory 420 may be any form of volatile or non-volatile memory including, without limitation, magnetic media, optical media, random access memory (RAM), read-only memory (ROM), flash memory, removable media, or any other suitable local or remote memory component or components. In particular embodiments, memory 420 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 420 may include one or more memories 420, where appropriate. Memory 420 may store any suitable data or information utilized by the computer system 400, including software embedded in a computer readable medium, and/or encoded logic incorporated in hardware or otherwise stored (e.g., firmware). In particular embodiments, memory 420 may include main memory for storing instructions for processor 408 to execute or data for processor 408 to operate on. In particular embodiments, one or more memory management units (MMUs) may reside between processor 408 and memory 420 and facilitate accesses to memory 420 requested by processor 408.

As an example, and not by way of limitation, the computer system 400 may load instructions from storage 410 or another source (such as, for example, another computer system) to memory 420. Processor 408 may then load the instructions from memory 420 to an internal register or internal cache. To execute the instructions, processor 408 may retrieve the instructions from the internal register or internal cache and decode them. During or after execution of the instructions, processor 408 may write one or more results (which may be intermediate or final results) to the internal register or internal cache. Processor 408 may then write one or more of those results to memory 420. In particular embodiments, processor 408 may execute only instructions in one or more internal registers or internal caches or in memory 420 (as opposed to storage 410 or elsewhere) and may operate only on data in one or more internal registers or internal caches or in memory 420 (as opposed to storage 410 or elsewhere).

In particular embodiments, storage 410 may include mass storage for data or instructions. As an example, and not by way of limitation, storage 410 may include a hard disk drive (HDD), a floppy disk drive, flash memory, an optical disc, a magneto-optical disc, magnetic tape, or a Universal Serial Bus (USB) drive or a combination of two or more of these. Storage 410 may include removable or non-removable (or fixed) media, where appropriate. Storage 410 may be internal or external to the computer system 400, where appropriate. In particular embodiments, storage 410 may be non-volatile, solid-state memory. In particular embodiments, storage 410 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 410 may take any suitable physical form and may comprise any suitable number or type of storage. Storage 410 may include one or more storage control units facilitating communication between processor 408 and storage 410, where appropriate.

In particular embodiments, interface 406 may include hardware, encoded software, or both providing one or more interfaces for communication (such as, for example, packet-based communication) among any networks, any network devices, and/or any other computer systems. As an example, and not by way of limitation, communication interface 406 may include a network interface controller (NIC) or network adapter for communicating with an Ethernet or other wire-based network and/or a wireless NIC (WNIC) or wireless adapter for communicating with a wireless network.

Depending on the embodiment, interface 406 may be any type of interface suitable for any type of network for which computer system 400 is used. As an example, and not by way of limitation, computer system 400 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 400 may include any suitable interface 406 for any one or more of these networks, where appropriate.

In some embodiments, interface 406 may include one or more interfaces for one or more I/O devices. One or more of these I/O devices may enable communication between a person and the computer system 400. As an example, and not by way of limitation, an V/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 406 for them. Where appropriate, interface 406 may include one or more drivers enabling processor 408 to drive one or more of these I/O devices. Interface 406 may include one or more interfaces 406, where appropriate.

Bus 404 may include any combination of hardware, software embedded in a computer readable medium, and/or encoded logic incorporated in hardware or otherwise stored (e.g., firmware) to couple components of the computer system 400 to each other. As an example, and not by way of limitation, bus 404 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 404 may include any number, type, and/or configuration of buses 404, where appropriate. In particular embodiments, one or more buses 404 (which may each include an address bus and a data bus) may couple processor 408 to memory 420. Bus 404 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 408 (such as, for example, one or more internal registers or caches), one or more portions of memory 420, one or more portions of storage 410, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of automatic exception handling for robotic processes, the method comprising, by a computer system:
   causing a bot to execute a robotic process as a user in a computing environment provided by the computer system, the execution of the robotic process comprising the bot automatically executing a plurality of computer-implemented tasks via user interaction with one or more user interfaces of a software application executing in the computing environment;
   monitoring the computing environment for unexpected process scenarios experienced by the bot, during the execution of the robotic process, in the one or more user interfaces of the software application;
   responsive to the monitoring, detecting that the bot has encountered an unexpected process scenario, during the execution of the robotic process, in the one or more user interfaces of the software application;
   receiving input data regarding at least of one of data or conditions related to the unexpected process scenario encountered by the bot executing the robotic process, wherein the input data includes data regarding a particular user interface of the software application in which the unexpected process scenario is presented;
   processing the input data to yield resultant data for analysis, the resultant data comprising information related to user-interface text from the particular user interface in which the unexpected process scenario is presented;
   generating a prediction dataset identifying at least one handling option for the unexpected process scenario, wherein the generating is based, at least in part, on the information related to user-interface text; and
   providing data related to the prediction dataset to the bot as an instruction for handling the unexpected process scenario.

2. The method of claim 1, wherein the processing comprises transforming heterogeneous log data for the bot into homogeneous log data, the heterogeneous log data comprising a plurality of different formats and the homogeneous log data comprising a structured format.

3. The method of claim 1, wherein the processing comprises generating at least one cognitive rule via execution of at least one of natural language processing and natural language understanding on at least a portion of the resultant data.

4. The method of claim 1, wherein the processing comprises generating at least one cognitive rule via execution of at least one of natural language processing and natural language understanding on at least a portion of the user-interface text.

5. The method of claim 4, wherein the generating the prediction dataset utilizes the at least one cognitive rule and artificial intelligence based on one or more libraries.

6. The method of claim 1, wherein the processing comprises extracting at least a portion of the user-interface text from an image of the particular user interface in which the unexpected process scenario is presented.

7. The method of claim 1, wherein the providing data comprises:
segregating the prediction dataset into a plurality of types of handling options; and
instructing the bot according to at least a portion of the segregated prediction dataset.

8. The method of claim 1, wherein the at least one handling option is selected from the group consisting of action, information and warning.

9. The method of claim 1, comprising:
receiving feedback related to operation of the bot; and
executing self-learning related to handling of the unexpected process scenario using the feedback.

10. The method of claim 1, wherein the at least one handling option comprises an action to be taken in the particular user interface in which the unexpected process scenario is presented.

11. The method of claim 1, wherein the bot handles the unexpected process scenario according to the instruction without modification to the bot.

12. A computer system comprising a processor and memory, wherein the processor and the memory in combination are operable to implement a method comprising:
causing a bot to execute a robotic process as a user in a computing environment provided by the computer system, the execution of the robotic process comprising the bot automatically executing a plurality of computer-implemented tasks via user interaction with one or more user interfaces of a software application executing in the computing environment;
monitoring the computing environment for unexpected process scenarios experienced by the bot, during the execution of the robotic process, in the one or more user interfaces of the software application;
responsive to the monitoring, detecting that the bot has encountered an unexpected process scenario, during the execution of the robotic process, in the one or more user interfaces of the software application;
receiving input data regarding at least of one of data or conditions related to the unexpected process scenario encountered by the bot executing the robotic process, wherein the input data includes data regarding a particular user interface of the software application in which the unexpected process scenario is presented;
processing the input data to yield resultant data for analysis, the resultant data comprising information related to user-interface text from the particular user interface in which the unexpected process scenario is presented;
generating a prediction dataset identifying at least one handling option for the unexpected process scenario, wherein the generating is based, at least in part, on the information related to user-interface text; and
providing data related to the prediction dataset to the bot as an instruction for handling the unexpected process scenario.

13. The computer system of claim 12, wherein the bot handles the unexpected process scenario according to the instruction without modification to the bot.

14. The computer system of claim 12, wherein the processing comprises generating at least one cognitive rule via execution of at least one of natural language processing and natural language understanding on at least a portion of the resultant data.

15. The computer system of claim 13, wherein the processing comprises generating at least one cognitive rule via execution of at least one of natural language processing and natural language understanding on at least a portion of the user-interface text.

16. The computer system of claim 15, wherein the generating the prediction dataset utilizes the at least one cognitive rule and artificial intelligence based on one or more libraries.

17. The computer system of claim 12, wherein the processing comprises extracting at least a portion of the user-interface text from an image of the particular user interface in which the unexpected process scenario is presented.

18. The computer system of claim 12, wherein the providing data comprises:
segregating the prediction dataset into a plurality of types of handling options; and
instructing the bot according to at least a portion of the segregated prediction dataset.

19. The computer system of claim 12, wherein the at least one handling option is selected from the group consisting of action, information and warning.

20. A computer-program product comprising a non-transitory computer-usable medium having computer-readable program code embodied therein, the computer-readable program code adapted to be executed to implement a method comprising:
causing a bot to execute a robotic process as a user in a computing environment, the execution of the robotic process comprising the bot automatically executing a plurality of computer-implemented tasks via user interaction with one or more user interfaces of a software application executing in the computing environment;
monitoring the computing environment for unexpected process scenarios experienced by the bot, during the execution of the robotic process, in the one or more user interfaces of the software application;
responsive to the monitoring, detecting that the bot has encountered an unexpected process scenario, during the execution of the robotic process, in the one or more user interfaces of the software application;
receiving input data regarding at least of one of data or conditions related to the unexpected process scenario encountered by the bot executing the robotic process, wherein the input data includes data regarding a particular user interface of the software application in which the unexpected process scenario is presented;
processing the input data to yield resultant data for analysis, the resultant data comprising information related to user-interface text from the particular user interface in which the unexpected process scenario is presented;
generating a prediction dataset identifying at least one handling option for the unexpected process scenario, wherein the generating is based, at least in part, on the information related to user-interface text; and
providing data related to the prediction dataset to the bot as an instruction for handling the unexpected process scenario.

* * * * *